United States Patent [19]

Masuda et al.

[11] Patent Number: 5,008,580
[45] Date of Patent: Apr. 16, 1991

[54] PIEZOELECTRIC VIBRATION GENERATOR AND VIBRATORY PARTS FEEDER INCORPORATING THE SAME

[75] Inventors: Takeshi Masuda, Kurobe; Susumu Yagi, Toyama; Sakiichi Okabe, Ishikawa; Yoichi Kamishima; Kazuo Kawagoe, both of Toyama, all of Japan

[73] Assignee: Yoshida Kogyo K. K., Tokyo, Japan

[21] Appl. No.: 305,919

[22] Filed: Feb. 3, 1989

[30] Foreign Application Priority Data

Feb. 3, 1988 [JP] Japan .................. 63-23299
Oct. 4, 1988 [JP] Japan .................. 63-250284

[51] Int. Cl.$^5$ .......................................... H01L 41/08
[52] U.S. Cl. ..................... 310/321; 310/323; 310/331; 310/328
[58] Field of Search ......... 310/321, 323, 328, 330-332

[56] References Cited

U.S. PATENT DOCUMENTS

| | | | |
|---|---|---|---|
| 3,304,773 | 2/1967 | Rogallo | 310/331 X |
| 3,336,529 | 8/1967 | Tygart | 310/331 X |
| 3,564,304 | 2/1971 | Thorn et al. | 310/323 |
| 3,668,442 | 6/1972 | Vosseler | 310/323 |
| 3,748,503 | 7/1973 | Cobarg et al. | 310/331 |
| 3,837,102 | 9/1974 | Golay | 310/332 X |
| 4,188,645 | 2/1980 | Ragle | 310/331 X |
| 4,544,858 | 10/1985 | Nishiguchi et al. | 310/321 |
| 4,769,570 | 9/1988 | Yokoyama et al. | 310/332 |
| 4,862,030 | 8/1989 | Yokoyama et al. | 310/332 |

FOREIGN PATENT DOCUMENTS

| | | |
|---|---|---|
| 519512 | 12/1981 | Australia . |
| 1093290 | 11/1960 | Fed. Rep. of Germany . |
| 2441982 | 6/1980 | France . |
| 235664 | 4/1945 | Switzerland ............ 310/331 |

*Primary Examiner*—Mark O. Budd
*Attorney, Agent, or Firm*—Hill, Van Santen, Steadman & Simpson

[57] ABSTRACT

A piezoelectric vibration generator interconnecting a base and a vibratory conveyor table of a piezoelectrically driven vibratory parts feeder includes a pair of resilient plate members joined together at their lower ends and disposed in a configuration substantially folded about the joint therebetween. The vibration generator of the folded configuration has a relatively small length and hence is capable of reducing the overall height of the vibratory parts feeder. A further advantage attained by the folded vibration generator is that the amplitude of vibrations is not limited depending upon the distance between the base and the vibratory conveyor table.

52 Claims, 8 Drawing Sheets

PIEZOELECTRIC VIBRATION GENERATOR AND VIBRATORY PARTS FEEDER INCORPORATING THE SAME

BACKGROUND OF THE INVENTION

1. Field of the Invention:

The present invention relates to a piezoelectric vibration generator having piezoelectric elements attached to opposite surfaces or sides of a resilient plate for generating slight vibratory motion, and also to a vibratory parts feeder incorporating such piezoelectric vibration generator for feeding small parts or articles in a predetermined supplying direction.

2. Description of the Prior Art:

Typical piezoelectrically driven vibratory parts feeders of the type described are disclosed in Japanese Patent Laid-open Publication (JP-A) No. 62-4118, 62-4119 and 62-4120. The disclosed parts feeders include a base and a vibratory conveyor table supported on the base by means of a plurality of properly spaced apart and obliquely disposed piezoelectric vibration generators. Each of the piezoelectric vibration generators comprises a leaf spring secured at a lower end to the base and carrying on its opposite surfaces a pair of piezoelectric elements, and an elongate resonant or amplitude enhancing member extending continuously and upwardly from the upper end of the leaf spring and secured at its upper end to the vibratory conveyor table. The amplitude enhancing member has a stiffness smaller than the stiffness of the leaf spring and hence is bendable easier than the leaf spring. When the piezoelectric elements are driven by an alternating voltage, the leaf spring is caused to shorten and lengthen alternately, thus producing longitudinal vibrations whose amplitude is in turn enhanced by the amplitude enhancing member. The thus enhanced vibratory impulses are imparted to the vibratory conveyor table, causing small parts or articles to move in a predetermined supplying direction along a path defined on the upper surface of the conveyor table. The amplitude enhancing member is formed either as a separate connecting member which is structurally independent of the leaf spring, or as an upper extension of the leaf spring which is integral with the leaf spring.

With the provision of the amplitude enhancing member, relatively large vibratory impulses can be imparted to the vibratory conveyor table. However, the amplitude of vibrations thus obtained is still limited to a certain level as the overall length of the vibration generator is determined depending upon the distance between the base and the vibratory conveyor table. It is therefore likely to occur that a desired amplitude of vibration cannot be produced from the prior art vibration generator. Another difficulty associated with the prior art vibratory parts feeder is that the amplitude enhancing member, which extends upwardly from the upper end of the leaf spring and has a smaller stiffness than the leaf spring, must be rigid enough to withstand the loads imparted thereon from the vibratory conveyor table. Since the stiffness of the amplitude enhancing member is inversely proportionate to the amplitude of vibrations produced from the vibration generator, setting of the amplitude of vibrations requires a fine adjustment of the stiffness of the amplitude enhancing member, which is tedious and time-consuming. Furthermore, the prior art vibratory parts feeder is relatively large in height as the leaf spring and the amplitude enhancing member extend linearly between the base and the vibratory conveyor table.

SUMMARY OF THE INVENTION

With the foregoing difficulties in view, it is accordingly an object of the present invention to provide a piezoelectric vibration generator for a vibratory parts feeder, which is capable of producing a desired amplitude of vibrations irrespective of the distance between a base and a vibratory conveyor table of the parts feeder.

Another object of the present invention is to provide a piezoelectric vibration generator which is rigid enough to withstand the loads imparted thereon from the vibratory conveyor table of a vibratory parts feeder incorporating the vibration generator.

A further object of the present invention is to provide a piezoelectric vibration generator for a vibratory parts feeder, which is small in height and hence is capable of reducing the overall height of the vibratory parts feeder.

Another object of the present invention is to provide a piezoelectric vibration generator for producing slight vibrations whose amplitude can be adjusted easily without the necessity of a fine adjustment of the stiffness of the vibration generator.

A still further object of the present invention is to provide a piezoelectrically driven vibratory parts feeder which is relatively low in height and can easily be incorporated in a processing machine.

According to a first aspect of the present invention, there is provided a piezoelectric vibration generator comprising: at least two resilient plate members joined together at their one ends, which are free-standing and disposed in a U-shaped configuration substantially folded about the joint therebetween; and a pair of piezoelectric elements attached respectively to front and back surfaces of one of the resilient plate members.

According to a second aspect of the present invention, there is provided a piezoelectrically driven vibratory parts feeder comprising: a stationary base; a vibratory conveyor table; and at least one piezoelectric vibration generator interconnecting the base and the vibratory conveyor table and operable to impart vibratory impulses to the vibratory conveyor table, the piezoelectric vibration generator including at least two resilient plate members joined together at their one ends and disposed in a configuration substantially folded about the joint therebetween with their opposite ends directed upwardly, the opposite end of one of the resilient plate members being firmly connected to the base, the opposite end of the other resilient plate member being firmly connected to the vibratory conveyor table, and a pair of piezoelectric elements attached respectively to front and back surfaces of one of the resilient plate members.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Figure 1:
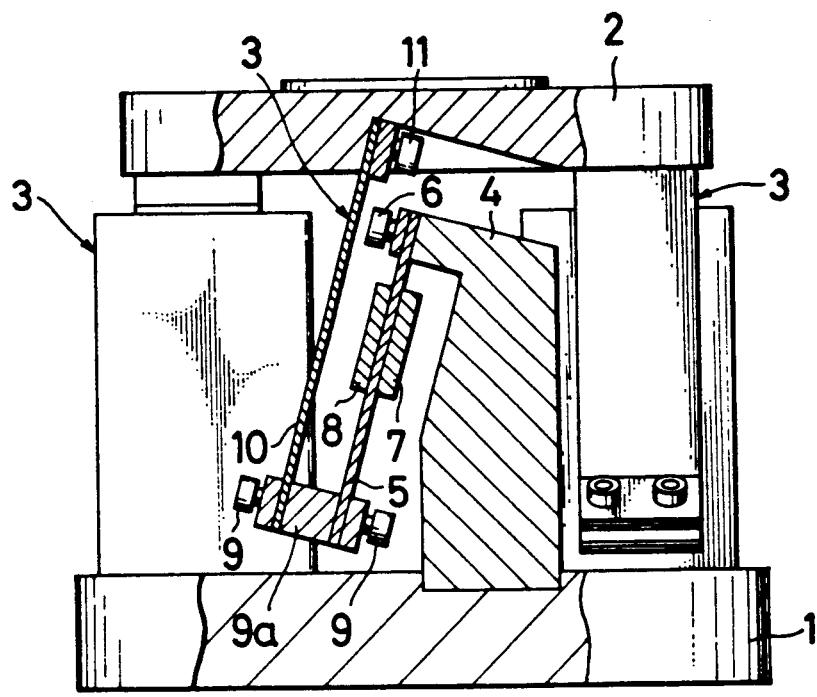
FIG. 1 is a front elevational view, with parts cut away for clarity a vibratory parts feeder incorporating piezoelectric vibration generators according to the present invention.
Figure 2:
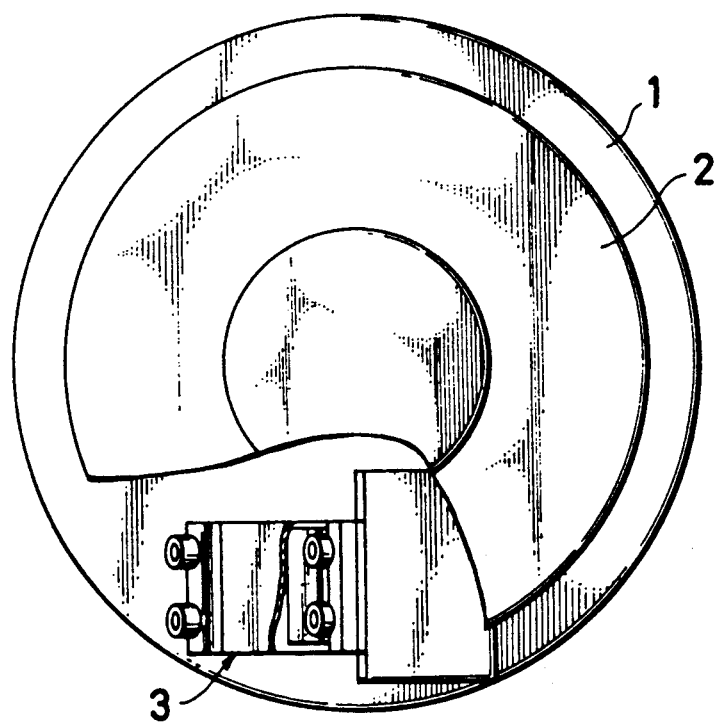
FIG. 2 is a plan view, with parts cut away for clarity, of the vibratory parts feeder shown in FIG. 1.

FIGS. 1 and 2 show a piezoelectrically driven vibratory parts feeder incorporating piezoelectric vibration generators according to the present invention. The illustrated parts feeder is of the vibratory feeder bowl type but the present invention is also applicable to a vibratory parts feeder of the linear vibratory feeder type.

The vibratory parts feeder includes a circular stationary base 1 and a circular vibratory conveyor table 2 disposed above the base 1 and supporting thereon a parts feeder bowl (not shown), and a plurality (four in the illustrated embodiment) of piezoelectric vibration generators 3 disposed between the base 1 and the vibratory conveyor table 2 and circumferentially spaced at equal angular intervals. Each of the piezoelectric vibration generators 3 includes a pair of parallel spaced first and second elongate resilient plate members 5, 10 extending obliquely with respect to the vertical, and a pair of piezoelectric elements 7, 8 attached to opposite surfaces or sides of the first resilient plate member 5. The first and second resilient plate members 5, 10 comprise leaf springs formed of flat rectangular plates of metal or synthetic resin. The first resilient plate member 5 has an upper end firmly secured by a pair of screws 6 to the upper end of an upstanding support bracket 4 which extends upwardly from the base 1 toward the vibratory conveyor table 2 and terminates short of the underside of the vibratory conveyor table 2. The lower end of the first resilient plate member 5 is firmly connected by screws 9 to the lower end of the second resilient plate member 10 with a spacer block 9a disposed between the respective lower ends of the first and second resilient plate members 5, 10. The second resilient plate member 10 is firmly secured at its upper end to the underside of the vibratory conveyor table 2 by means of screws 11. The first and second resilient plate members 5, 10 are disposed in face to face confrontation to one another. Thus, the piezoelectric vibration generator 3 has a substantially U-shaped configuration which is folded about the joint between the first and second resilient plate members 5, 10. The second resilient plate member 10 is longer than the first resilient plate member 5 and also thinner than the first resilient plate member 5. The first and second resilient plate members 5, 10 may have the same thickness. The piezoelectric elements 7, 8 may be attached to the second resilient plate member 10.

In operation, an alternating voltage is applied to the piezoelectric elements 7, 8 to shorten and lengthen the piezoelectric elements 7, 8 and, consequently, the first resilient plate member 5, thereby producing slight longitudinal vibrations on the first resilient plate member 5. The thus produced longitudinal vibrations are amplified or enhanced by the second resilient plate member 10 and then imparted to the vibratory conveyor table 2, thereby causing small parts or articles to move upwardly along a helical spiral feed path or track provided in the non-illustrated vibratory feeder bowl. The amplitude of vibrations to be imparted to the vibratory conveyor table 2 can be adjusted accurately and easily by changing the length and the thickness of the second resilient plate member 10. The second resilient plate member 10 may be notched when a fine adjustment of the amplitude of vibrations is necessary. Since the vibration generator 3 has a folded configuration, the overall length or longitudinal extent of the vibration generator 3 is relatively small. Consequently, a substantial reduction of the overall height of the vibratory parts feeder can be attained. Furthermore, loads acting on the second resilient plate member 10 are efficiently absorbed by such folded configuration of the vibration generator 3 and hence the vibration generator 3 is subjected to only a small bending moment. The vibration generator 3 is therefore durable in construction.

Figure 3:
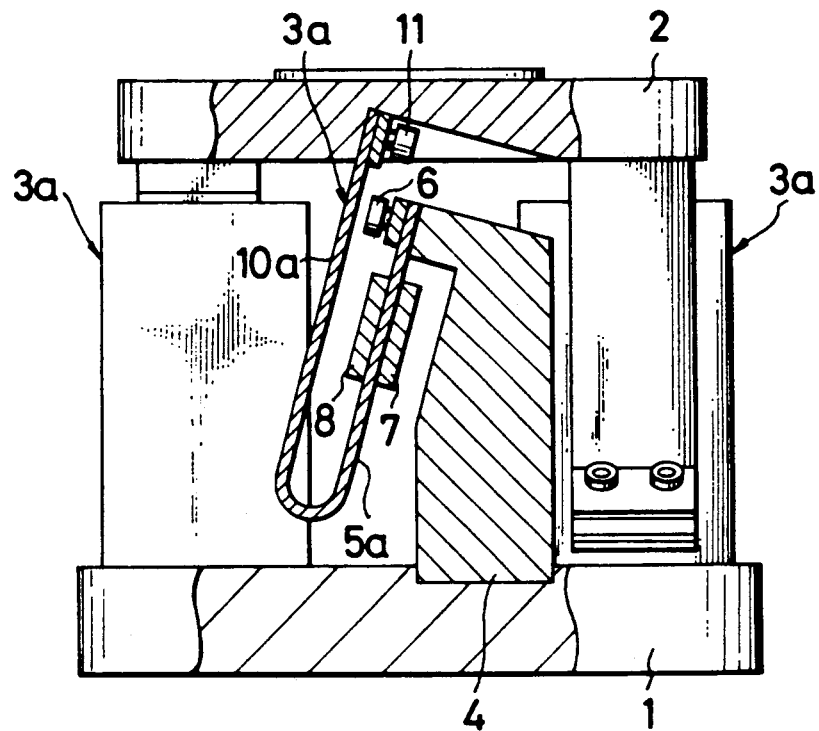
FIG. 3 is a view similar to FIG. 1, but showing a vibratory parts feeder having modified piezoelectric vibration generators.

A modified vibratory parts feeder shown in FIG. 3 is substantially the same in structure and operation as the vibratory parts feeder shown in FIG. 1 with the exception that each piezoelectric vibration generator 3a is formed of a single flat rectangular plate bent into a substantially U shape. First and second resilient plate members 5a, 10a of the vibration generator 3a are integrally joined at their lower ends. The vibration generator 3a is simple in construction and can be manufactured at a low cost.

Figure 4:
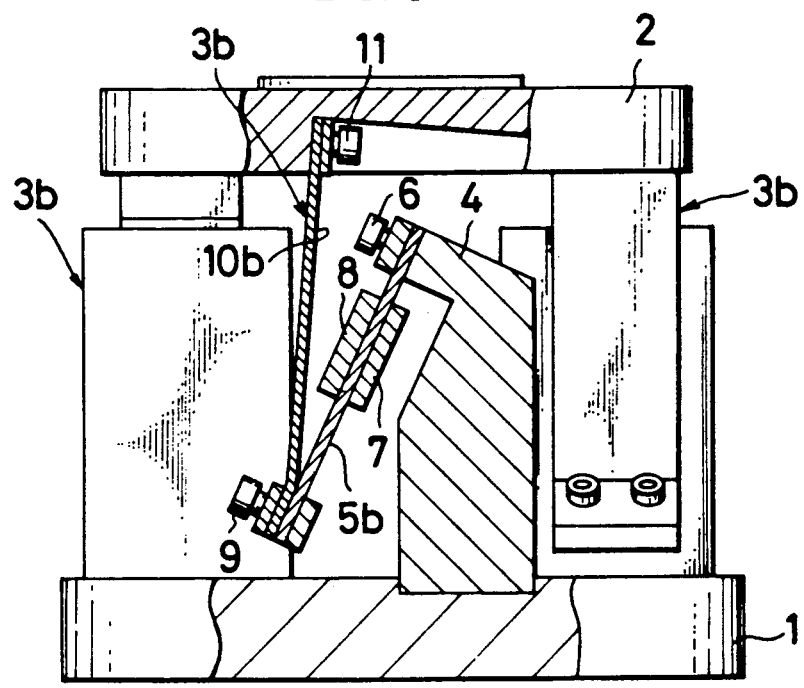
FIG. 4 is a view similar to FIG. 1, but showing a vibratory parts feeder having another set of modified piezoelectric vibration generators.

FIG. 4 shows a piezoelectric vibration generator 3b incorporated in a similar vibratory parts feeder. The vibration generator 3b is similar to the vibration generator 3 shown in FIG. 1 but differs therefrom in that first and second resilient plate members 5b, 10b are directly connected together at their lower ends and they extend at an angle to one another. Thus, the vibration generator 3b has a substantially V shape foled or bent about the joint between the first and second resilient plate members 5b, 10b. The angle of inclination of the second resilient plate member 10b is determined on consideration of the angle of inclination of a helical spiral feed path provided in a parts feeder bowl (not shown) carried on the vibratory conveyor table 2.

Figure 5:
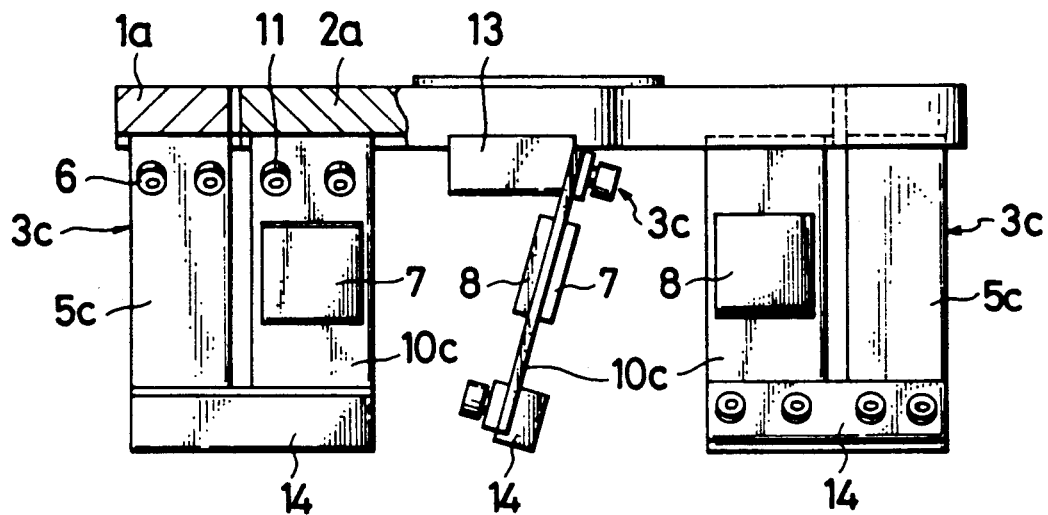
FIG. 5 is a front elevational view, with parts cut away for clarity, of another vibratory parts feeder including modified piezoelectric vibration generators.
Figure 6:
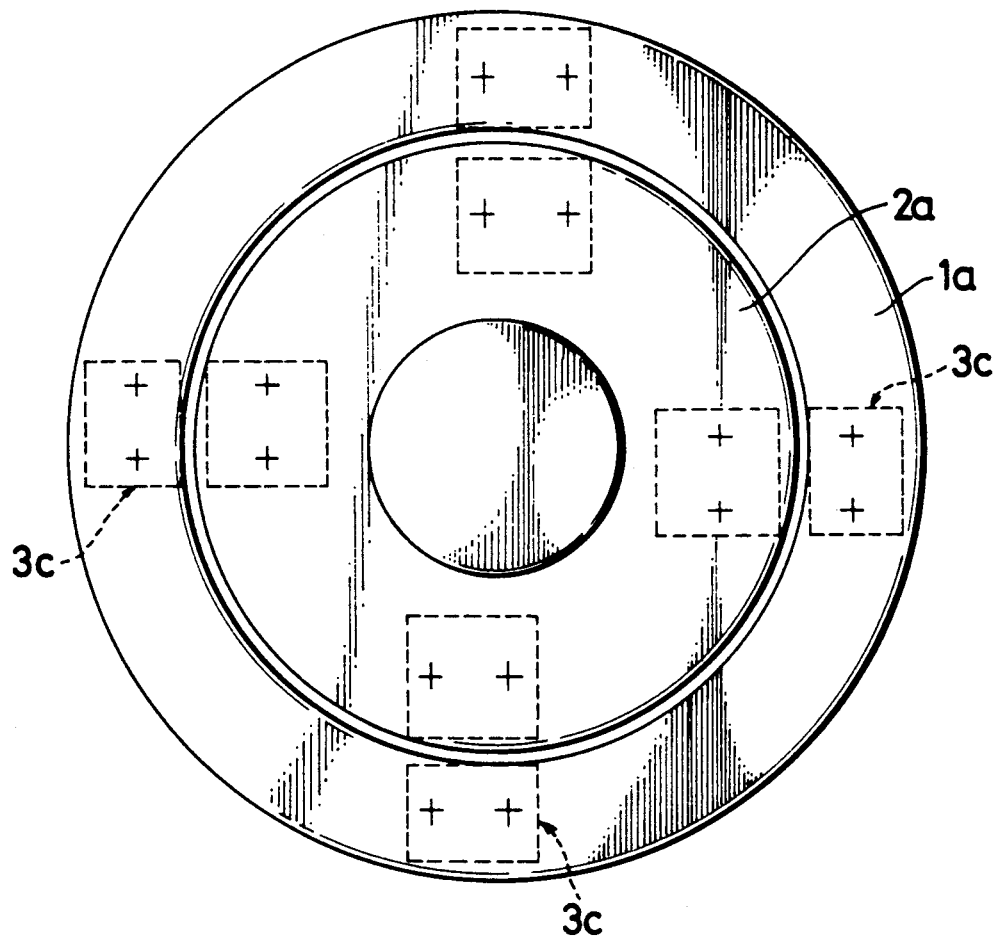
FIG. 6 is a plan view of FIG. 5.

A modified piezoelectrically driven vibratory parts feeder shown in FIGS. 5 and 6 includes a ring-shaped stationary base 1a and a circular vibratory conveyor table 2a supported within a circular central opening of the ring-shaped base 1a by means of a plurality of piezoelectric vibration generators 3c. Thus, the base 1a and the vibratory conveyor table 2a lie in the same horizontal plane. The piezoelectric vibration generators 3c are disposed concentrically around the center of the vibratory conveyor table 2a at equal circumferential intervals as shown in FIG. 6 and interconnect the base 1a and the vibratory conveyor table 2a. Each of the piezoelectric vibration generators 3c comprises a pair of parallel spaced first and second elongate resilient plate members 5c, 10c extending obliquely with respect to the vertical, and a pair of piezoelectric elements 7, 8 attached to opposite surfaces or sides of the second resilient plate member 10c. The first and second resilient plate members 5c, 10c have the same length and the same thickness and each plate member 5c, 10c comprises a leaf spring formed of a flat rectangular plate of metal or synthetic resin. The first resilient plate member 5c is firmy secured at its upper end to the underside of the base 1a by means of screws 6. The lower end of the first resilient plate member 5c is firmly connected to the lower end of the second resilient plate member 10c via a connector plate 14. The upper end of the second resilient plate member 10c is firmy secured by screws 11 to a mounting bracket 13 which is firmly connected to the underside of the vibratory conveyor table 2a. The first and second resilient plate members 5c, 10c are disposed in side by side juxtaposition to one another. With this arrangement, the vibration generator 3c has a substantially U-shaped configuration bent or folded about the joint between the first and second resilient plate members 5c, 10c. The vibratory parts feeder operates in the same manner as the vibratory parts feeder of the preceding embodiments shown in FIGS. 1 through 4. Advantageously, this vibratory parts feeder is substantially flat and low in profile and hence can be easily incorporated in various processing machines.

Figure 7:
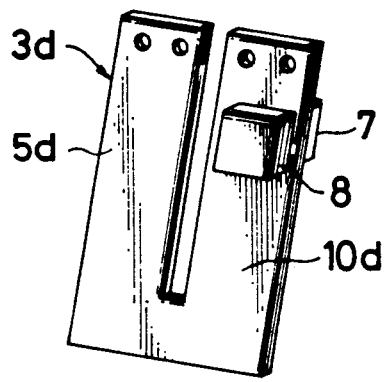
FIG. 7 is a perspective view showing a modified form of the vibration generator incorporated in the vibratory parts feeder shown in FIG. 6.

FIG. 7 shows a modified piezoelectric vibration generator 3d which can be used in place of the vibration generator 3c shown in FIG. 5. This vibration generator 3d is substantially the same as the vibration generator 3c exceping that the vibration generator 3d is formed of a single flat plate stamped into a U shape. Thus, a pair of parallel juxtaposed first and second resilient plate members 5d, 10d of the vibration generator 3d are joined integrally at their lower ends. With this integral formation of the first and second resilient plate members 5d, 10d, the vibration generator 3d is simple in construction and can be manufactured less costly.

Figure 8:
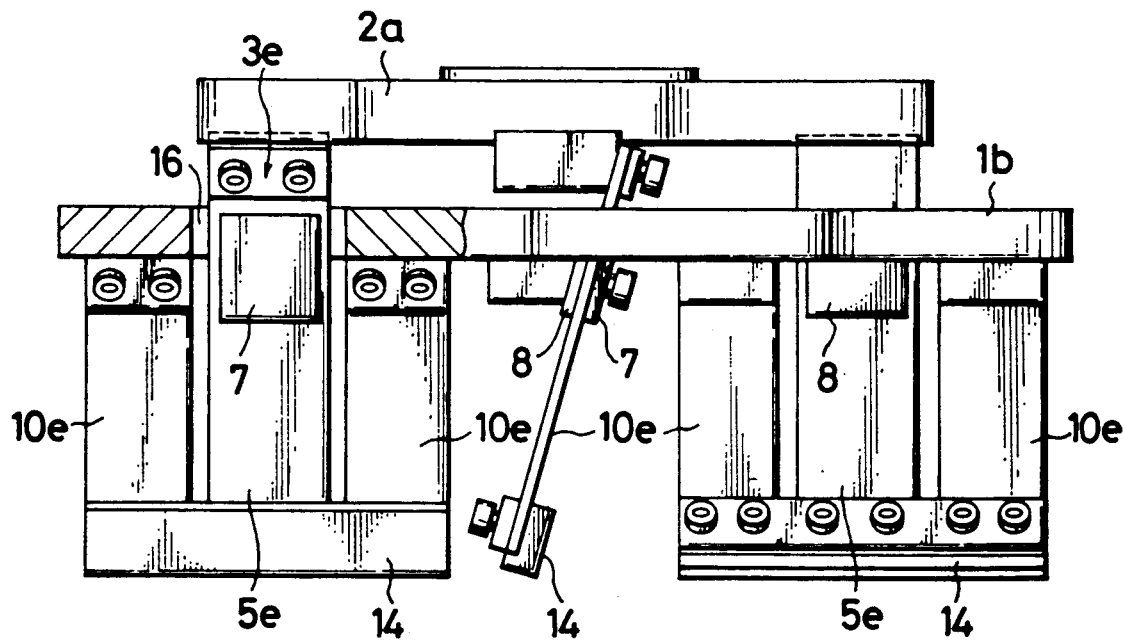
FIG. 8 is a front elevational view, with parts cut away for clarity, of a vibratory parts feeder having modified piezoelectric vibration generators.

A modified vibratory parts feeder shown in FIG. 8 is similar to the vibratory parts feeder shown in FIG. 5 but differs therefrom in that a stationary base 1b and a vibratory conveyor table 2a are both circular in shape and the vibratory conveyor table 2a is supported in a horizontal plane slightly above the base 1b. The base 1b has a plurality of openings or apertures 16 circumferentially spaced at equal angular intervals. The vibratory parts feeder further includes a plurality of piezoelectric vibration generators 3e corresponding in number to the number of the apertures 16 in the base 1b and disposed in respective positions corresponding to the respective positions of the apertures 16. Each of the piezoelectric vibration generators 3e is composed of a first resilient plate member 5e and two identical second resilient plate members 10e, 10e disposed on opposite sides of the first resilient plate member 5e in side by side juxtaposition with respect to the first resilient plate member 5e. The respective upper ends of the second resilient plate members 10e, 10e are firmly secured to the underside of the base 1b at positions which are located on diametrically opposite sides of the corresponding one of the apertures 16. The respective lower ends of the second resilient plate members 10e are firmly secured to a rectangular connector plate 5e to which the lower end of the first resilient plate member 5e is also firmly secured. The first resilient plate member 5e extends upwardly through the corresponding aperture 16 and firmly secured at its upper end to the underside of the vibratory conveyor table 2a. The first resilient plate member 5e carries on its opposite surfaces or sides a pair of piezoelectric elements 7, 8. The piezoelectric elements 7, 8 may be attached to at least one of the second resilient plate members 10e, 10e. Furthermore, the first and second resilient plate members 5e, 10e may be united into integral formation in such a manner as the same as the piezoelectric vibration generator 3d shown in FIG. 7.

As appears clear from the foregoing embodiments, and those embodiments shown in FIGS. 1, 5 and 8 in particular, the vibration generator having a folded configuration is capable of producing a desired amplitude of vibrations irrespective of the distance between the base and the vibratory conveyor table.

Figure 9:
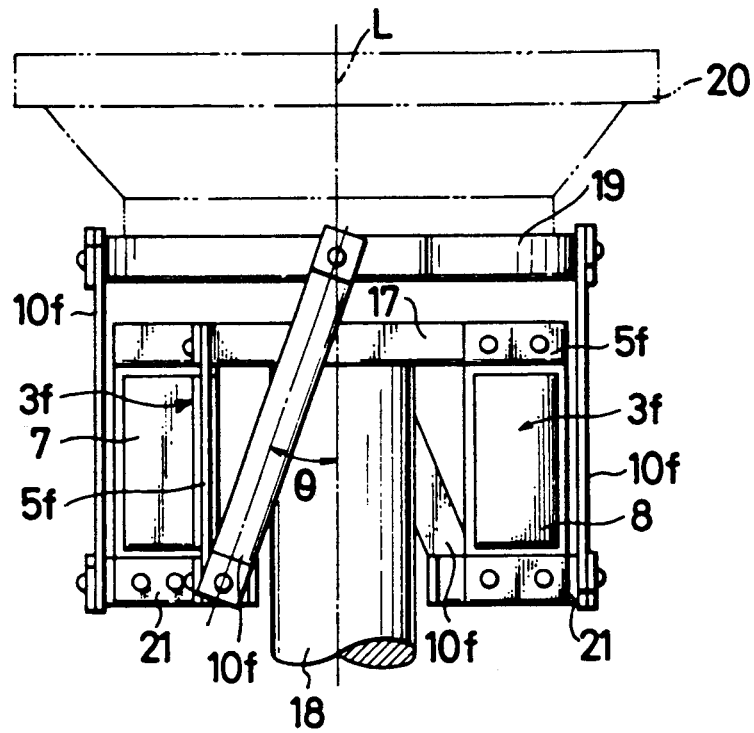
FIG. 9 is a front elevational view of another vibration parts feeder incorporating modified piezoelectric vibration generators.
Figure 10:
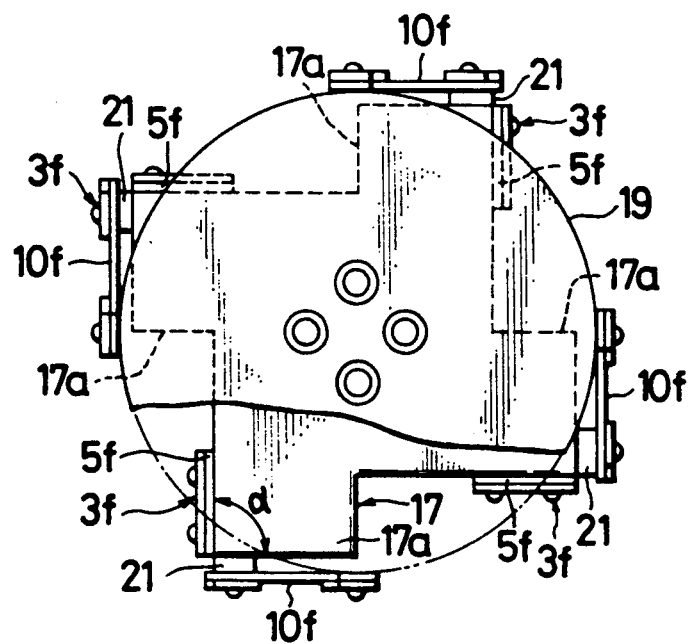
FIG. 10 is a plan view, with parts cut away for clarity, of the vibratory parts feeder shown in FIG. 9.

FIGS. 9 and 10 show a modified vibratory parts feeder according to the present invention. The parts feeder includes a horizontal base 17 firmly connected to the upper end of a vertical supporting post 18, a circular vibratory conveyor table 19 disposed above the base 17 and carrying thereon a parts feeder bowl 20, and a plurality (four in the illustrated embodiment) of piezoelectric vibration generators 3f interconnecting the base 17 and the vibratory conveyor table 19. The base 17, as shown in FIG. 10, is in the shape of a windmill having four identical rectangular wings 17a. Each of the piezoelectric vibration generators 3f includes a vertically disposed first resilient plate member 5f firmly connected at its upper end to one of two adjacent sides of each respective rectangular wing 17a, and an obliquely disposed second resilient plate member 10f connected at its lower end to the lower end of the first resilient plate member 5f via a rectangular connector block 21, the upper end of the second resilient plate member 10f being firmly secured to the peripheral surface of the circular vibratory conveyor table 18. The first resilient plate member 5f carries on its opposite surfaces or sides a pair of piezoelectric elements 7, 8.

Figure 11:
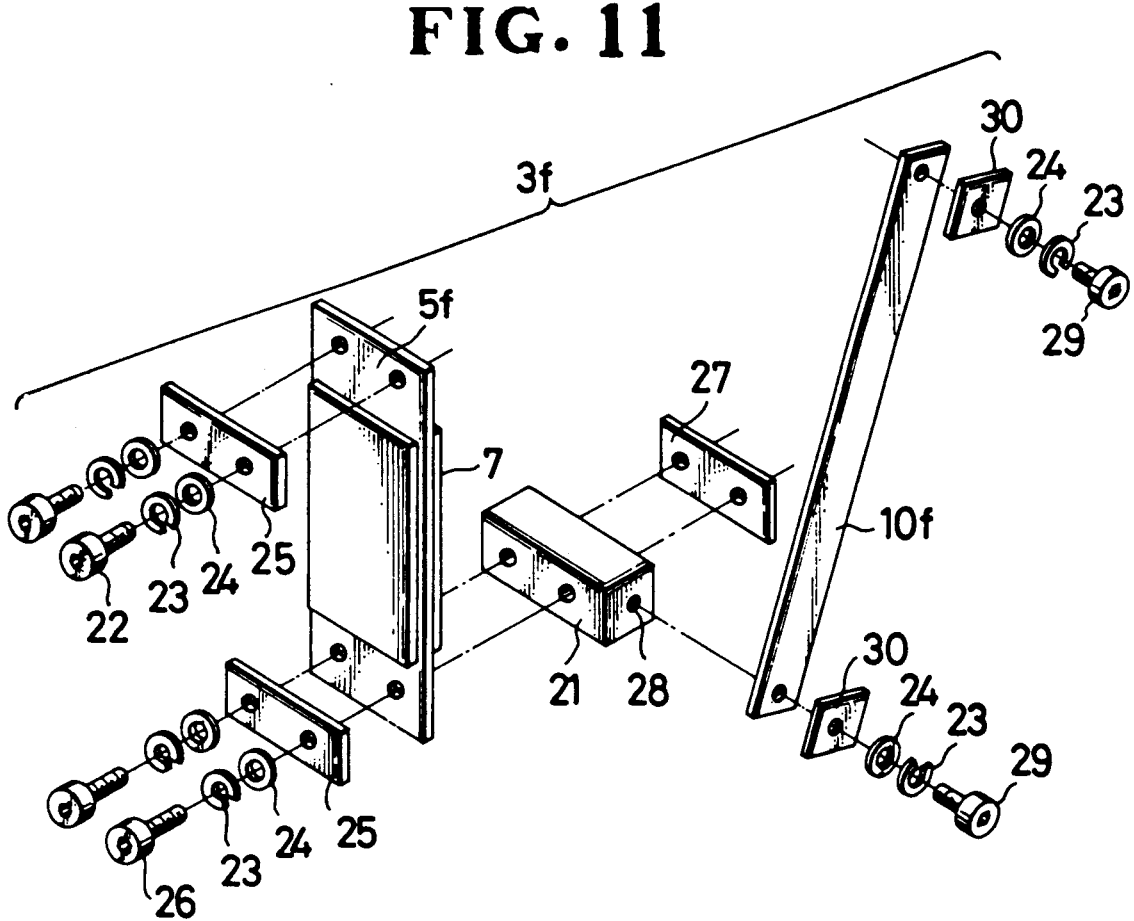
FIG. 11 is an enlarged exploded perspective view of one of the piezoelectric vibration generators shown in FIG. 9.

As shown in FIG. 11, attachment of the upper end of the first resilient plate member 5f to the base 17 is performed by means of a pair of screws 22 which pass successively through spring washers 23, washers 24, holes in a presser plate 25, and holes in the plate member 5f and are threaded into threaded holes in the base 17. Likewise, the lower end of the plate member 5f is connected to the connector block 21 by a pair of screws 26 that pass successively through spring washers 23, washers 24, holes in another presser plate 25, holes in the plate member 5f, and transverse holes in the connector block 21 and are threaded into threaded holes in a retainer plate 27. The retainer palte 27 may be omitted when the transverse holes in the connector block 21 are internally threaded. The connector block 21 further has a threaded longitudinal hole 28 into which a screw 29 is threaded to attached the lower end of the second resilient plate member 10f to the connector block 21. The screw 29 passes successively through a spring washer 23, a washer 24, a hole in the presser plate 30, and a lower hole in the second resilient plate member 10f. The upper end of the second resilient plate member 10f is secured by a screw 29 that passes through a spring washer 23, a washer 24, a hole in another presser plate 30, and an upper hole in the plate member 10f.

Each of the first and second resilient plate members 5f, 10f is formed of a flat rectangular resilient plate of metal or synthetic resin. The second resilient plate member 10f lies in a vertical plane extending tangentially with respect to the peripheral surface of the circular vibratory conveyor table 19. The first resilient plate member 5f lies in a plane extending at an angle $\alpha$ of about 90 degrees, as shown in FIG. 10. This angle $\alpha$ can be varied by displacing the first resilient plate member 5f along the side of the rectangular wing 17a. When the first resilient plate member 5f is displaced inwardly of the base 17, the angle $\alpha$ becomes greater than 90 degrees. Conversely, the angle $\alpha$ becomes smaller than 90 degrees as the plate member 5f is displaced outwardly of the base 17. The adjustment of the angle $\alpha$ is performed in such a manner as to enable the second resilient plate member 10f to be attached to the peripheral surface of the circular vibratory conveyor table 19.

As shown in FIG. 9, the second resilient plate member 10f is inclined with respect to the vertical (indicated by nearly equal to the angle of inclination of a helical spiral feed path or track provided in the parts feeder bowl 20 but, in practice, it is experimentally determined with reference to the angle of inclination of the hilical spiral feed path. The angle $\theta$ can be varied either by changing the length of the second resilient plate member 10f, by displacing the position of the joint between the first and second resilient plate members 5f, 10f inwardly or outwardly of the base 17, or by displacing the first resilient plate member 5f inwardly or outwardly of the base 17.

Figure 12:
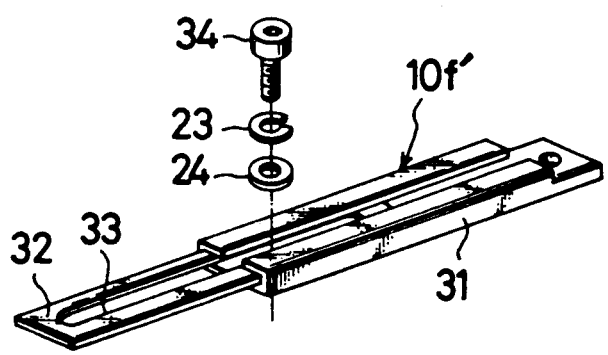
FIG. 12 is a perspective view shown in a modified resonant member of the piezoelectric vibration generator.
Figure 13:
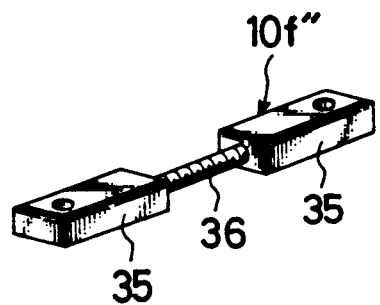
FIG. 13 is a view similar to FIG. 12, but showing another modification of the resonant member.

The change of the length of the second resilient plate member 10f can be achieved simply by replacing the plate member 10f with another plate member whose length is different to the length of the plate member 10f. Alternatively, it is possible to use a second resilient plate member which is adjustable in length, such as shown in FIGS. 12 and 13. The plate member 10f' shown in FIG. 12 includes a channel shaped elongate holder 31 adapted to be connected at its one end to the vibratory conveyor table 19 (FIG. 9), and an elongate slide 32 slidably received in a longitudinal guide channel in the holder 31 and having a longitudinal groove 33. A lock screw 34 passes through a longitudinal slot in the holder 31 and through the longitudinal groove 33 in the slide 32 and is threaded into a threaded hole (not shown) formed in the bottom wall of the holder 31. When the screw 34 is loosened, the slide 32 is movable along the guide channel in the holder 31 to thereby change the overall length of the plate member 10f'. The slide 32 is locked in position against displacement by tightening the screw 34 until the slotted upper wall of the holder 31 is resiliently flexed inwardly toward the bottom wall, thus gripping the slide 32 by and between the upper and bottom walls of the holder 31.

A modified second resilient plate member 10f'' shown in FIG. 13 includes a pair of flat rectangular plate elements 35, 35 interconnected at their one ends by a stud screw 36. The overall length of the plate member 10f'' can be varied by turning at least one plate element 35 in either direction.

Figure 14:
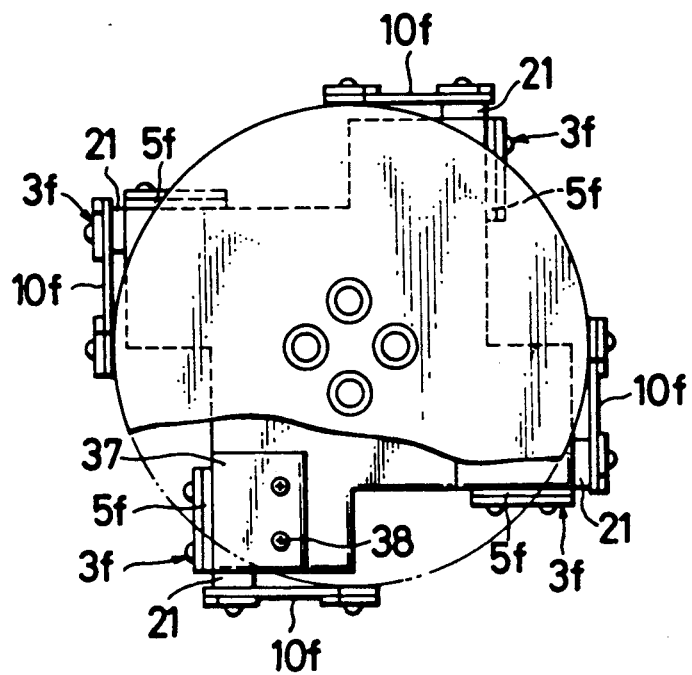
FIG. 14 is a plan view, with parts cut away for clarity, of a modified vibratory parts feeder.
Figure 15:
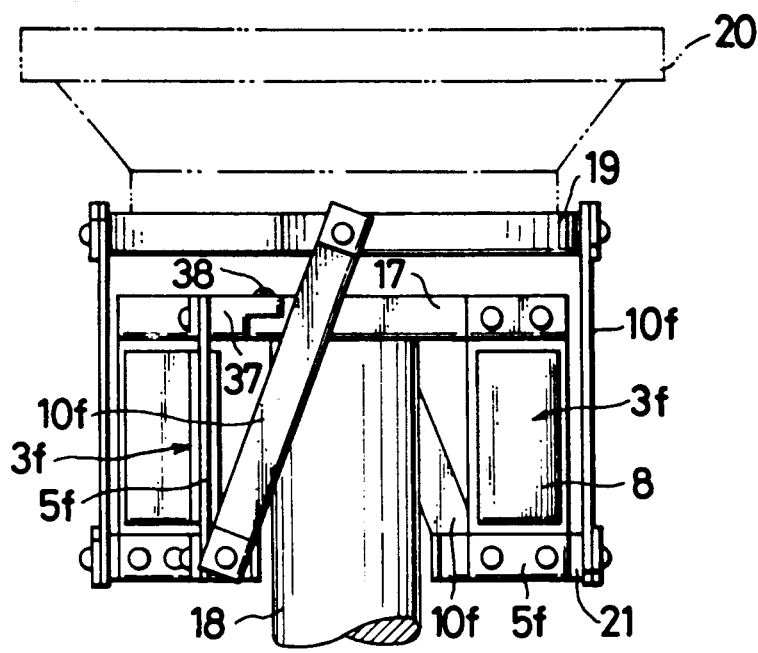
FIG. 15 is a front elevational view of the vibratory parts feeder shown in FIG. 14.
Figure 16A:
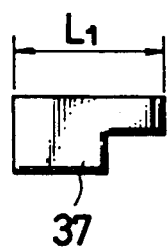
FIGS. 16A through 16C are enlarged front elevational views respectively showing different brackets used for the attachment of the piezoelectric vibration generator to a base of the vibratory parts feeder shown in FIG. 14.
Figure 16B:
Figure 16C:

FIGS. 14 and 15 show the manner in which the position of the joint between the first and second resilient plate members 5f, 10f is displaced inwardly and outwardly with respect to the vertical support post 18 for adjustably changing the angle of inclination of the second resilient plate member 10f. In the illustrated embodiment, the adjustment of this inclination angle is achieved by utilizing a mounting bracket 37 which is detachably connected by screws 38 to the base 17 and to which the upper end of the first resilient plate member 5f is firmly secured. The mounting bracket 37 has a length L1 as shown in FIG. 16A. When the angle of inclination of the plate member 10f is to be changed, the mounting bracket 37 is replaced by another mounting bracket 39 which has a smaller length L2 than the mounting bracket 37, as shown in FIG. 16B. As an alternative, the mounting bracket 37 may be replaced with a mounting bracket 40 having a sloped surface 41 on which one side of the first resilient plate member 5f is disposed flatwise when the plate member 5f is connected at its upper end to the base 17.

The vibratory parts feeders shown in FIGS. 9 through 15 not only possess the same advantages as those attained by the vibratory parts feeders shown in FIGS. 1 throgh 6 and 8, but also are advantageous over the latter-mentioned vibratory parts feeders in that when an adjustment of the amplitude and direction of vibrations is necessary, the angle of inclination of the second resilient plate member 10f can be easily adjusted to a desired value either by replacing the second resilient plate member 10f with another one having a different length, or by changing the length of the second resilient plate member 10f', 10f'', without the necessity of replacement of the first resilient plate member on which the piezoelectric elements 7, 8 are attached. Furthermore, such adjustment can be carried out easily because the second resilient plate member 10f is attached to the peripheral surface of the vibratory conveyor table 19 and hence is easily accessible.

Obviously, various modifications and variations of the present invention are possible in the light of the above teaching. It is therefore to be understood that within the scope of the appended claims the invention may be practiced otherwise than as specifically described.

What is claimed is:

1. A piezoelectric vibration generator comprising:
   (a) at least two resilient plate members joined together at their one ends, which are free-standing and disposed in a U-shaped configuration substantially folded about the joint therebetween, their opposite ends being directly upwardly and separately secured to supports; and
   (b) a pair of piezoelectric elements attached respectively to front and back surfaces of one of said resilient plate members.

2. A piezoelectric vibration generator according to claim 1, said resilient plate members extending in parallel spaced relation to one another.

3. A piezoelectric vibration generator according to claim 1, said resilient plate members being disposed in face to face confrontation to one another.

4. A piezoelectric vibration generator according to claim 3, further including a spacer block disposed between said resilient plate members at said one ends of the latter.

5. A piezoelectric vibration generator according to claim 1, said resilient plate members being disposed in side by side juxtaposition to one another.

6. A piezoelectric vibration generator according to claim 5, further including a connector plate interconnecting said resilient plate members at said one ends of the latter.

7. A piezoelectric vibration generator according to claim 1, said resilient plate members extending at an angle to one another.

8. A piezoelectric vibration generator according to claim 7, one of said resilient plate members having one face lying in a plane extending at an angle to a face of the other resilient plate member.

9. A piezoelectric vibration generator according to claim 8, said angle being nearly equal to 90 degrees.

10. A piezoelectric vibration generator according to claim 1, said resilient plate members being integral with each other.

11. A piezoelectric vibration generator according to claim 1, the other of said resilient plate members being thinner than said one resilient plate member.

12. A piezoelectric vibration generator according to claim 1, said resilient plate members having the same thickness.

13. A piezoelectric vibration generator according to claim 1, said resilient plate members having the same length.

14. A piezoelectric vibration generator according to claim 1, said resilient plate members having different lengths.

15. A piezoelectric vibration generator according to claim 14, the other of said resilient plate members being longer than said one resilient plate member.

16. A piezoelectric vibration generator according to claim 14, said one resilient plate member being longer than the other of said resilient plate members.

17. A piezoelectric vibration generator according to claim 1, at least one of said resilient plate members being ajustable in length.

18. A piezoelectric vibration generator according to claim 17, said one resilient plate member including an elongate holder, a slide movably received in said holder, and a fastener for locking the slide in position against displacement relative to said holder.

19. A piezoelectric vibration generator according to claim 17, said one resilient plate member including a pair of elongate plate elements, and a stud screw interconnecting one ends of said plate elements.

20. A piezoelectric driven vibratory parts feeder comprising:
 (a) a stationary base;
 (b) a vibratory conveyor table; and
 (c) at least one piezoelectric vibration generator interconnecting said base and said vibratory conveyor table and operable to impart vibratory impulses to said vibratory conveyor table, said piezoelectric vibration generator including
  (i) at least two resilient plate members joined together at their one ends, which are free-standing and disposed in a U-shaped configuration substantially folded about the joint therebetween with their opposite ends directed upwardly being firmly connected to said base, the opposite end of the other resilient plate member being firmly connected to said vibratory conveyor table, and
  (ii) a pair of piezoelectric elements attached respectively to front and back surfaces of one of said resilient plate members.

21. A piezoelectrically driven vibratory parts feeder according to claim 20, said vibratory conveyor table being disposed above said base, said base including an upstanding mounting bracket extending vertically upwardly from an upper surface of said base and terminating short of the underside of said vibratory conveyor table, said opposite end of said one resilient plate member being firmly secured to an upper end of said upstanding mounting bracket, said opposite end of said other resilient plate member being firmly secured to the underside of said vibratory conveyor table.

22. A piezoelectrically driven vibratory parts feeder according to claim 21, said resilient plate members being disposed in substantially face to face confrontation to one another.

23. A piezoelectrically driven vibratory parts feeder according to claim 20, said base having an annular shape, said vibratory conveyor table being disposed within a central opening in said annular base, said annular base and said vibratory conveyor table lying in the same plane.

24. A piezoelectrically driven vibratory parts feeder according to claim 23, said resilient plate members having the same length and being disposed in parallel juxtaposition to one another.

25. A piezoelectrically driven vibratory parts feeder according to claim 20, said vibratory conveyor table being disposed above said base, said base having an aperture, said resilient plate members being parallel spaced and disposed in side by side juxtaposition to one another, one of said resilient plate members being longer than the other resilient plate member and extending through said aperture.

26. A piezoelectrically driven vibratory parts feeder according to claim 25, the number of said resilient plate members being three, two of said three resilient plate members having the same length and disposed on opposite sides of the remaining resilient plate member, said remaining resilient plate member being longer than said two resilient plate members and extending through said aperture.

27. A piezoelectrically driven vibratory parts feeder according to claim 20, said vibratory convryor table being disposed above said base, the respective other ends of said resilient plate members being secured respectively to an outer side surface of said base and an outer side surface of said vibratory conveyor table.

28. A piezoelectrically driven vibratory parts feeder according to claim 27, said one resilient plate member extending substantially vertically and having one face lying in a first vertical plane, said other resilient plate member extending obliquely with respect to the vertical and having one face lying in a second vertical plane extening at an angle to said first plane.

29. A piezoelectrically driven vibratory parts feeder according to claim 28, said angle being nearly equal to 90 degrees.

30. A piezoelectrically driven vibratory parts feeder according to claim 28, further including means for changing the angle of inclination of said othr resilient plate member, said changing means comprising a mounting bracket secured to said outer side surface of said base and supporting thereon said other end of said one resilient plate member.

31. A piezoelectrically driven vibratory parts feeder according to claim 30, said mounting bracket having a sloped surface supporting flatwise thereon said one face of said one resilient plate member.

32. A piezoelectrically driven vibratory parts feeder according to claim 27, said other resilient plate member being adjustable in length.

33. A piezoelectriccally driven vibratory parts feeder according to claim 32, said other resilient plate member including an elongate holder, a slide movably received in said holder, and a fastener for locking the slide in position against displacement relative to said holder.

34. A piezoelectrically driven vibratory parts feeder according to claim 32, said other resilient plate member including a pair of elongate plate elements, and a stud screw interconnecting one ends of said plate elements.

35. A piezoelectrically driven vibratory parts feeder according to claim 20, said resilient plate members extending in parallel spaced relation to one another.

36. A piezoelectrically driven vibratory parts feeder according to claim 20, said resilient plate members being disposed in face to face confrontation to one another.

37. A piezoelectrically driven vibratory parts feeder according to claim 36, further including a spacer block disposed between said resilient plate members at said one ends of the latter.

38. A piezoelectrically driven vibratory parts feeder according to claim 20, said resilient plate members being disposed in side by side juxtaposition to one another.

39. A piezoelectrically driven vibratory parts feeder according to claim 38, further including a connector plate interconnecting said resilient plate members at said one ends of the latter.

40. A piezoelectrically driven vibratory parts feeder according to claim 20, said resilient plate members extending at an angle to one another.

41. A piezoelectrically driven vibratory parts feeder according to claim 40, one of said resilient plate members having one face lying in a plane extending at an angle to a face of the other resilient plate member.

42. A piezoelectrically driven vibratory parts feeder according to claim 41, said angle being nearly equal to 90 degrees.

43. A piezoelectrically driven vibratory parts feeder according to claim 20, said resilient plate members being integral with each other.

44. A piezoelectrically driven vibratory parts feeder according to claim 20, the other of said resilient plate members being thinner than said one resilient plate member.

45. A piezoelectrically driven vibratory parts feeder according to claim 20, said resilient plate members having the same thickness.

46. A piezoelectrically driven vibratory parts feeder according to claim 20, said resilient plate members having the same length.

47. A piezoelectrically driven vibratory parts feeder according to claim 20, said resilient plate members having different lengths.

48. A piezoelectrically driven vibratory parts feeder according to claim 47, said other resilient plate member being longer than said one resilient plate member.

49. A piezoelectrically driven vibratory parts feeder according to claim 47, said one resilient plate member being longer than the other of said reilient plate members.

50. A piezoelectric vibration generator according to claim 20, at least one of said resilient plate members being adjustable in length.

51. A piezoelectrically driven vibratory parts feeder according to claim 50, said one resilient plate member including an elongate holder, a slide movably received in said holder, and a fastener for locking the slide in position against displacement relative to said holder.

52. A piezoelectrically driven vibratory parts feeder according to claim 50, said one resilient plate member including a pair of elongate plate elements, and a stud screw interconnecting one ends of said plate elements.

* * * * *